(12) United States Patent
Paden et al.

(10) Patent No.: US 11,525,691 B2
(45) Date of Patent: Dec. 13, 2022

(54) SYSTEM AND METHOD FOR AUTONOMOUS MOTION PLANNING

(71) Applicant: Samsung Electronics Co., Ltd., Suwon-si (KR)

(72) Inventors: Brian Paden, San Jose, CA (US); Allen Xiao, Durham, NC (US); Imran A. Pirwani, Campbell, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/023,219

(22) Filed: Sep. 16, 2020

(65) Prior Publication Data

US 2021/0088345 A1 Mar. 25, 2021

Related U.S. Application Data

(60) Provisional application No. 63/056,483, filed on Jul. 24, 2020, provisional application No. 62/903,600, filed on Sep. 20, 2019.

(51) Int. Cl.
*G01C 21/34* (2006.01)
*G05D 1/02* (2020.01)

(52) U.S. Cl.
CPC ....... *G01C 21/3461* (2013.01); *G05D 1/0214* (2013.01)

(58) Field of Classification Search
CPC ... G05D 1/0212; G05D 1/0238; B60W 30/09; B60W 2554/00; B60W 30/0956; B60W 30/0953; B60W 30/095
See application file for complete search history.

(56) References Cited

U.S. PATENT DOCUMENTS

| 6,266,610 | B1 | 7/2001 | Schultz et al. |
| 7,079,943 | B2 | 7/2006 | Flann et al. |
| 7,447,593 | B2 | 11/2008 | Estkowski et al. |
| 8,605,947 | B2 | 12/2013 | Zhang et al. |
| 9,418,560 | B1 * | 8/2016 | Rosenwald .......... G05D 1/0005 |
| 9,477,789 | B2 | 10/2016 | Koch |

(Continued)

OTHER PUBLICATIONS

Durand, Fredo, "3D Visibility: Analytical Study and Applications," http://people.csail.mit.edu/fredo/THESE/vo.pdf, Jul. 12, 1999, pp. 1-305.

(Continued)

*Primary Examiner* — Ryan Rink
(74) *Attorney, Agent, or Firm* — Lewis Roca Rothgerber Christie LLP

(57) ABSTRACT

A motion planning system includes: a processor; and memory to store instructions that when executed by the processor, cause the processor to: identify a reference path between a departure point and a destination point in an environment including one or more obstacles; generate decomposition segments of a space surrounding the reference path, the decomposition segments including a first free-space segment and a second free-space segment that are devoid of the obstacles; generating a first path segment relative to the reference path for traversing the first free-space segment, and a second path segment relative to the reference path for traversing the second free-space segment; and connecting the first and second path segments to each other to generate a navigational path to traverse the environment.

18 Claims, 12 Drawing Sheets

(56) References Cited

U.S. PATENT DOCUMENTS

| | | | |
|---|---|---|---|
| 9,523,583 B2 | 12/2016 | Mays et al. | |
| 9,524,647 B2 | 12/2016 | Kohn-Rich | |
| 10,223,816 B2 | 3/2019 | Dorum et al. | |
| 2006/0271898 A1* | 11/2006 | Kitamura | G06F 30/394 |
| | | | 716/134 |
| 2007/0293985 A1* | 12/2007 | Myeong | G05D 1/0274 |
| | | | 700/245 |
| 2010/0168890 A1 | 7/2010 | Fisher et al. | |
| 2012/0221237 A1* | 8/2012 | Jung | G05D 1/0274 |
| | | | 701/400 |
| 2014/0207325 A1* | 7/2014 | Mudalige | B62D 15/0255 |
| | | | 701/25 |
| 2016/0210863 A1* | 7/2016 | Kohn-Rich | G08G 5/0034 |
| 2017/0083021 A1* | 3/2017 | Balaghiasefi | G01C 21/3833 |
| 2020/0031340 A1* | 1/2020 | Tao | B60W 30/143 |
| 2020/0089239 A1* | 3/2020 | Navarro | G06Q 10/047 |
| 2020/0218277 A1* | 7/2020 | Cunningham | G01C 21/3407 |
| 2020/0341476 A1* | 10/2020 | Wuthishuwong | G01S 17/89 |
| 2020/0348684 A1* | 11/2020 | Zhang | G05D 1/0223 |
| 2021/0020045 A1* | 1/2021 | Huang | B60W 30/10 |
| 2021/0096576 A1* | 4/2021 | Grigorescu | G05D 1/0088 |
| 2021/0108936 A1* | 4/2021 | Seegmiller | G01C 21/3461 |
| 2021/0262819 A1* | 8/2021 | Yu | G01C 21/3602 |
| 2021/0278851 A1* | 9/2021 | Van der Merwe | B62D 15/025 |
| 2021/0354729 A1* | 11/2021 | Ng | B60W 60/0018 |
| 2022/0017112 A1* | 1/2022 | Liu | B60W 60/0011 |

OTHER PUBLICATIONS

Reif, John H., "Complexity of the Mover's Problem and Generalizations," 20th Annual Symposium on Foundations of Computer Science (sfcs 1979), IEEE, 1979, pp. 421-427.

McNaughton, M., et al., "Motion Planning for Autonomous Driving with a Conformal Spatiotemporal Lattice," 2011 IEEE International Conference on Robotics and Automation, May 2011, 7 pages.

* cited by examiner

SYSTEM AND METHOD FOR AUTONOMOUS MOTION PLANNING

CROSS-REFERENCE TO RELATED APPLICATION(S)

This application claims priority to and the benefit of U.S. Provisional Application No. 62/903,600, filed on Sep. 20, 2019, entitled "METHOD FOR GEOMETRIC PATH SMOOTHING EFFICIENTLY WHILE AVOIDING STATIC OBJECTS," and claims priority to and the benefit of U.S. Provisional Application No. 63/056,483, filed on Jul. 24, 2020, entitled "METHOD FOR GEOMETRIC PATH SMOOTHING EFFICIENTLY WHILE AVOIDING STATIC OBJECTS," the entire content of each of which is incorporated by reference herein.

FIELD

Aspects of one or more example embodiments of the present disclosure relate to systems and methods for autonomous motion planning with obstacle avoidance.

BACKGROUND

Autonomous motion planning is a computational problem for determining a sequence of paths in order to safely traverse an environment. Due to obstical avoidance, autonomous motion planning is a highly non-convex computational problem that may be considered as a PSPACE-hard problem. Thus, any complete algorithms may be exponentially complex. In practice, however, efficient specialized algorithms may be further designed and utilized to handle various different use cases.

The above information disclosed in this Background section is for enhancement of understanding of the background of the present disclosure, and therefore, it may contain information that does not constitute prior art.

SUMMARY

One or more example embodiments of the present disclosure are directed to an autonomous motion planning system. One or more example embodiments of the present disclosure are directed to methods for approximating an optimal path to traverse an environment while avoiding obstacles.

According to one or more example embodiments of the present disclosure, a motion planning system includes: a processor; and memory configured to store instructions that when executed by the processor, cause the processor to: identify a reference path between a departure point and a destination point in an environment including one or more obstacles; generate decomposition segments of a space surrounding the reference path, the decomposition segments including a first free-space segment and a second free-space segment that are devoid of the obstacles; generate a first path segment relative to the reference path for traversing the first free-space segment, and a second path segment relative to the reference path for traversing the second free-space segment; and connect the first and second path segments to each other to generate a navigational path to traverse the environment.

In an example embodiment, the first and second free-space segments may be orthogonal to the reference path.

In an example embodiment, to generate the decomposition segments, the instructions may further cause the processor to: identify a vertex of the one or more obstacles; and extend a ray orthogonal to the reference path from the vertex.

In an example embodiment, the instructions may further cause the processor to: convert a Euclidean coordinate system corresponding to the space of the environment to a curvilinear coordinate system corresponding to the first and second free-space segments.

In an example embodiment, the instructions may further cause the processor to: order the first and second free-space segments to generate a directed acyclic graph (DAG). The first and second free-space segments may correspond to nodes of the DAG, and the ray may correspond to an edge of the DAG connecting the nodes.

In an example embodiment, the ray may include a first ray corresponding to a first vertex of the one or more obstacles, a second ray corresponding to a second vertex of the one or more obstacles, and a third ray corresponding to a third vertex of the one or more obstacles; the first free-space segment may be bounded between the first ray and the second ray; and the second free-space segment may be bounded between the second ray and the third ray.

In an example embodiment, to generate the first and second path segments, the instructions may further cause the processor to: generate a first discrete sample point-heading pair along the first ray, a second discrete sample point-heading pair along the second ray, and a third discrete sample point heading pair along the third ray; connect the first discrete sample point-heading pair to the second discrete sample point-heading pair with a first curve; and connect the second discrete sample point-heading pair to the third discrete sample point heading pair with a second curve.

In an example embodiment, to generate the first and second path segments, the instructions may further cause the processor to: calculate a cost of the first curve relative to the reference path; calculate a cost of the second curve relative to the reference path; determine that the first curve and the second curve have minimum costs relative to the reference path; and set the first curve as the first path segment and the second curve as the second path segment.

In an example embodiment, to generate the first and second path segments, the instructions may further cause the processor to: generate a continuous cost value function for traversing between the first ray and the second ray; connect a point-heading pair along the first ray to a point-heading pair along the second ray with a first curve; generate a continuous cost value function for traversing between the second ray and the third ray; and connect a point-heading pair along the second ray to a point-heading pair along the third ray with a second curve.

In an example embodiment, to generate the first and second path segments, the instructions may further cause the processor to: evaluate a cost of the first curve by minimizing the continuous value function for traversing between the first ray and the second ray relative to the reference path; evaluate a cost of the second curve by minimizing the continuous value function for traversing between the second ray and the third ray relative to the reference path; and determine the first path segment and the second path segment based on the minimizations.

According to one or more example embodiments of the present disclosure, an autonomous motion planning method includes: identifying, by a processor, a reference path between a departure point and a destination point in an environment including one or more obstacles; generating, by the processor, decomposition segments of a space surrounding the reference path, the decomposition segments including a first free-space segment and a second free-space segment that are devoid of the obstacles; generating, by the processor, a first path segment relative to the reference path for traversing the first free-space segment, and a second path segment relative to the reference path for traversing the second free-space segment; and connecting, by the processor, the first and second path segments to each other to generate a navigational path to traverse the environment.

In an example embodiment, the first and second free-space segments may be orthogonal to the reference path.

In an example embodiment, to generate the decomposition segments, the method may further include: identifying, by the processor, a vertex of the one or more obstacles; and extending, by the processor, a ray orthogonal to the reference path from the vertex.

In an example embodiment, the method may further include: converting, by the processor, a Euclidean coordinate system corresponding to the space of the environment to a curvilinear coordinate system corresponding to the first and second free-space segments.

In an example embodiment, the method may further include: ordering, by the processor, the first and second free-space segments to generate a directed acyclic graph (DAG). The first and second free-space segments may correspond to nodes of the DAG, and the ray may correspond to an edge of the DAG connecting the nodes.

In an example embodiment, the ray may include a first ray corresponding to a first vertex of the one or more obstacles, a second ray corresponding to a second vertex of the one or more obstacles, and a third ray corresponding to a third vertex of the one or more obstacles; the first free-space segment may be bounded between the first ray and the second ray; and the second free-space segment may be bounded between the second ray and the third ray.

In an example embodiment, to generate the first and second path segments, the method may further include: generating, by the processor, a first discrete sample point-heading pair along the first ray, a second discrete sample point-heading pair along the second ray, and a third discrete sample point heading pair along the third ray; connecting, by the processor, the first discrete sample point-heading pair to the second discrete sample point-heading pair with a first curve; and connecting, by the processor, the second discrete sample point-heading pair to the third discrete sample point heading pair with a second curve.

In an example embodiment, to generate the first and second path segments, the method may further include: calculating, by the processor, a cost of the first curve relative to the reference path; calculating, by the processor, a cost of the second curve relative to the reference path; determining, by the processor, that the first curve and the second curve have minimum costs relative to the reference path; and setting, by the processor, the first curve as the first path segment and the second curve as the second path segment.

In an example embodiment, to generate the first and second path segments, the method may further include: generating, by the processor, a continuous cost value function for traversing between the first ray and the second ray; connecting, by the processor, a point-heading pair along the first ray to a point-heading pair along the second ray with a first curve; generating, by the processor, a continuous cost value function for traversing between the second ray and the third ray; and connecting, by the processor, a point-heading pair along the second ray to a point-heading pair along the third ray with a second curve.

In an example embodiment, to generate the first and second path segments, the method may further include: evaluating, by the processor, a cost of the first curve by minimizing the continuous value function for traversing between the first ray and the second ray relative to the reference path; evaluating, by the processor, a cost of the second curve by minimizing the continuous value function for traversing between the second ray and the third ray relative to the reference path; and determining, by the processor, the first path segment and the second path segment based on the minimizations.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
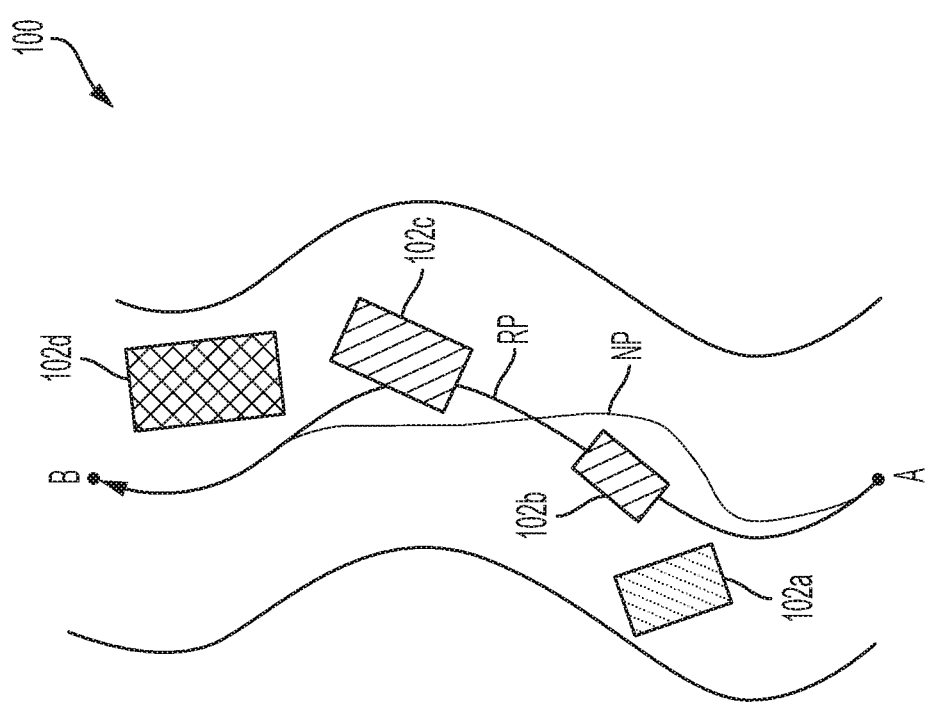
FIG. 1 is a diagram illustrating an example of an autonomous motion planning environment, according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Some autonomous motion planning techniques may be based on discrete approximations of a design space (e.g., continuous curves between two points), such that algorithmic searches may be simplified. However, such discrete motion planning techniques may be sub-optimal, resulting in awkward coarse obstacle avoidance paths (e.g., having wiggles, sudden movements, sharp movements, jerky movements, and/or the like), or may require such fine discretization that computational resource requirements thereof may be unacceptable. Thus, a smoothing operation may be performed to smooth out the coarse obstacle avoidance path, which may be at the expense of obstacle avoidance as the smoothing operation may cause deviations from the coarse obstacle avoidance path.

On the other hand, some autonomous motion planning techniques based on continuous design variables formulated as a non-linear computational problem may result in a computational problem that is not only non-convex, but that may result in a discontinuous utility function and/or a set of feasible solutions (e.g., based on local minima) that are not topologically connected to each other (e.g., which may lead to dead-ends). Thus, while some non-linear optimization techniques may be appropriate for some autonomous motion planning situations, these non-linear optimization techniques may be unsuitable generally as a complete algorithm in various other situations.

According to one or more example embodiments of the present disclosure, a navigational path may be determined according to a smooth reference path, such that the navigational path may avoid obstacles while having reduced awkward path segments (e.g., such as the wiggles, sudden movements, sharp movements, jerky movements, and/or the like). For example, in some embodiments, spaces relative to the reference path within an environment may be divided into a set of convex regions including free-space segments (e.g., unoccupied spaces) and occupied-space segments (e.g., spaces corresponding to one or more obstacles or objects). An ordering (e.g., a partial ordering) of the free-space segments may be used to convert a non-convex optimization problem into a set of small convex optimization problems that may be computed to determine the navigational path relative to the reference path, which may reduce computational workloads and runtimes. For example, each free-space segment may correspond to a convex optimization sub-problem that may be computed according to a discrete sampling of a suitable number of points along edges of the free-space segment for traversing the free-space segment, or a continuous sampling of points along the edges of the free-space segment for traversing the free-space segment, such that optimal (e.g., near-optimal) path segments through the free-space segments may be determined and connected to each other to generate the navigational path using the reference path as a constraint. Accordingly, a smooth navigational path may be generated according to the reference path to avoid collisions with the obstacles while preventing or reducing awkward movements. These and other aspects and features of the present disclosure will now be described in more detail with reference to the figures.

FIG. 1 is a diagram illustrating an example of an autonomous motion planning environment, according to one or more example embodiments of the present disclosure.

Referring to FIG. 1, in various embodiments, a computing device may be tasked with generating a path from an origin (e.g., a departure point or a departure location) A to a destination (e.g., a destination point or a destination location) B in an environment 100 (e.g., a real environment or a virtual environment). For example, in an autonomous system 200 (e.g., see FIG. 2), such as an autonomous robot or an autonomous vehicle (e.g., a self-driving vehicle), a computing device may determine a path (e.g., a reference path or curve RP) for the robot or vehicle to follow based on available map data. As another example, in a virtual world, for example, such as a video game, virtual reality, augmented reality, and/or the like, a computing device may determine a path (e.g., a reference path or curve RP) for an avatar (e.g., a playable character, a non-playable character, and/or the like) to follow from one point A in the virtual world to another point B in the virtual world. However, one or more obstacles 102a to 102b (collectively, 102) may be present along the generated path (e.g., the reference path or curve RP), such that it may be undesirable for an object (e.g., the robot, vehicle, avatar, and/or the like) traversing the generated path to collide with one or more of the obstacles 102. Further, it may be undesirable for the object to deviate too far from the generated path or to change directions too quickly or too sharply.

According to one or more example embodiments of the present disclosure, a computing device may identify (e.g., may receive or may determine) a representation of an environment 100, and a reference path RP. The environment 100 may correspond to a real environment or a virtual environment through which an object (e.g., a robot, a vehicle, an avatar, and/or the like) may travel. In some embodiments, the computing device may generate the representation of the environment 100 based on image data, map data, sensor data, any other suitable data, or a combination thereof. The reference path RP may correspond to a target path (e.g., an optimal path, a smooth path, or a shortest path) between the origin A and the destination B irrespective of any obstacles (e.g., static objects, slow-moving objects, and/or the like) 102 that may obstruct or surround (e.g., that may be located in or adjacent to) the reference path RP. In other words, the reference path RP may intersect one or more of the obstacles 102 according to the desired path between the origin A and the destination B. In various embodiments, the reference path RP may be generated based on map data, image data, sensor data, any other suitable data, or a combination thereof. Because the one or more obstacles 102 may obstruct or surround the reference path RP, the computing device may generate a navigational path NP that avoids collisions with the one or more obstacles 102 while staying relatively close to the reference path RP. For example, because the reference path RP, which is a target or smooth path, may be used to generate the navigational path NP that avoids obstacles, the navigational path NP may have reduced awkward movements when compared to motion planning systems that generate a navigational path based on only a departure point and a destination point. Accordingly, a smooth desired (e.g., optimal or near-optimal) navigational path NP may be generated according to the reference path RP that avoids obstacles while preventing or reducing awkward movements (e.g., the wiggles, sudden movements, sharp movements, jerky movements, and/or the like).

Figure 2:
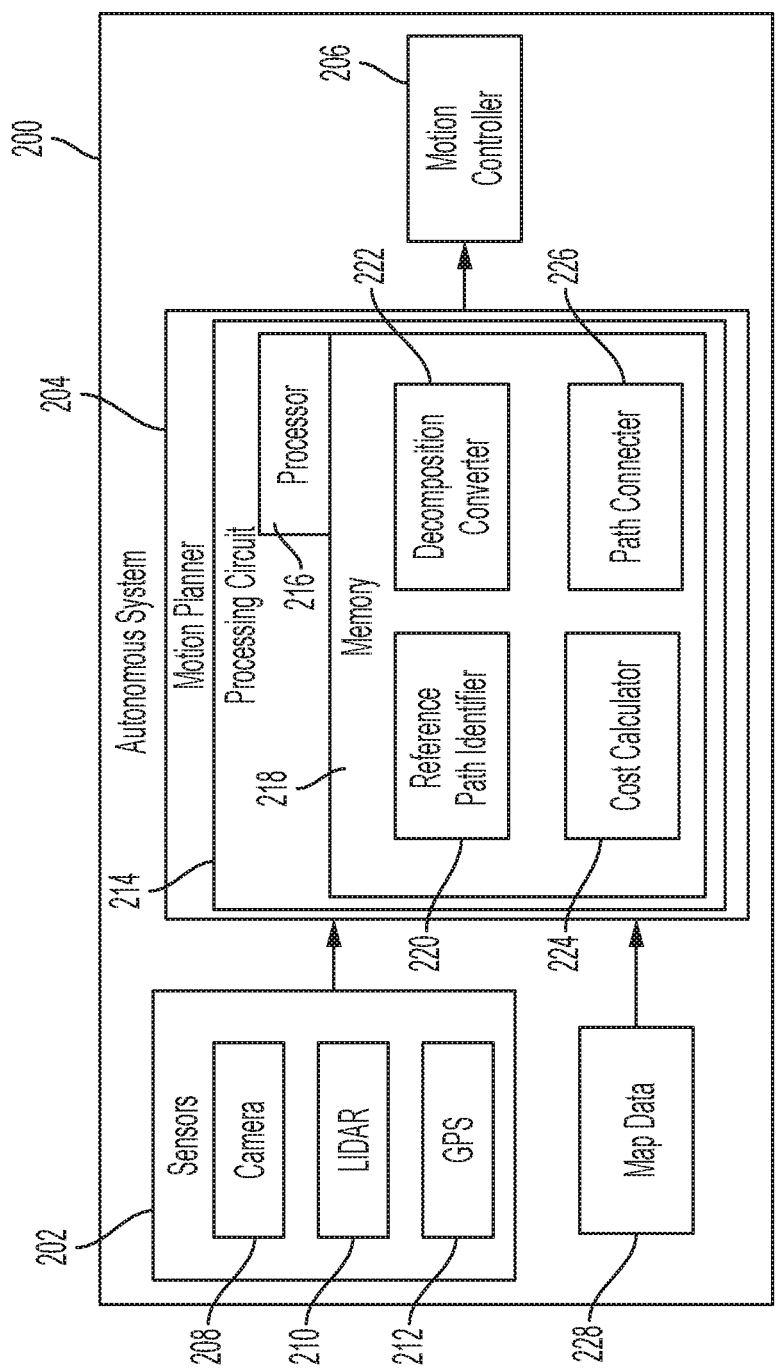
FIG. 2 is a block diagram illustrating an autonomous system, according to one or more example embodiments of the present disclosure.

FIG. 2 is a block diagram illustrating an autonomous system, according to one or more example embodiments of the present disclosure.

Referring to FIG. 2, the autonomous system 200 is shown as an example of a real-world object (e.g., an autonomous robot, a self-driving vehicle, and/or the like) including one or more sensors 202, a computing device (e.g., a motion planner) 204, and a motion controller 206. While FIG. 2 illustrates the autonomous system 200 as an example of a real-world object, the present disclosure is not limited thereto, and in other embodiments, the autonomous system 200 may correspond to a virtual object (e.g., an avatar) in a virtual environment controlled by a computing device (e.g., including the motion planner) 204, with appropriate modifications thereto. For convenience, the autonomous system 200 will be described in the context of the real-world object (e.g., an autonomous robot, an autonomous vehicle, and/or the like), but the present disclosure is not limited thereto.

In some embodiments, the one or more sensors 202 may provide data (e.g., image data, time-of-flight (TOF) data, position data, and/or the like) to the motion planner 204. For example, in various embodiments, the sensors 202 may include one or more of a camera 208, a radar, a LIDAR 210, a sonar, a Global Positioning System (GPS) 212, an odometer, an inertial measurement unit, and/or the like to capture representations of the environment 100 surrounding the autonomous system 200, and or a state or position of the autonomous system 200 within the environment 100. The motion planner 204 may be a computing device to generate a navigational path NP through the environment 100, and may provide the generated navigational path NP to the motion controller 206. The motion controller 206 may control the autonomous system 200 to automatically maneuver along the navigational path NP generated by the motion planner 204. In this respect, the motion controller 206 may include or may be communicably connected to any suitable controllers, drivers, motors, actuators, circuits, processors, and/or the like to automatically control the movement of the autonomous system 200 according to the generated navigational path NP.

In more detail, in some embodiments, the motion planner 204 may include a processing circuit 214 including a processor 216 and memory 218. In some embodiments, the processing circuit 214 may be communicably connected to the sensors 202 to receive the sensor data, and may be communicably connected to a mapping system (e.g., a third party mapping system) to receive map data 228. The processor 216 may be implemented as a general purpose processor, an application specific integrated circuit (ASIC), one or more field programmable gate arrays (FPGAs), a group of processing components, or other suitable electronic processing components. While FIG. 2 shows the motion planner 204 as being a part of the autonomous system 200, the present disclosure is not limited thereto, and the motion planner 204 may be implemented externally on one or more processing circuits that are distributed across multiple servers or computers (e.g., that can exist in distributed locations), or within a single computer (e.g., one server, one housing, and/or the like).

The memory 218 may include one or more devices (e.g., random-access memory (RAM), read-only memory (ROM), Flash memory, hard disk storage, and/or the like) for storing data and/or computer code for completing or facilitating the various processes described in the present application. Memory 218 may be or may include volatile memory and/or non-volatile memory. Memory 218 may include database components, object code components, script components, or any other type of information structure for supporting the various activities and information structures described in the present application. According to an example embodiment, memory 218 is communicably connected to the processor 216 via the processing circuit 214, and includes instructions (e.g., computer code) for executing (e.g., by the processing circuit 214 and/or the processor 216) one or more processes described herein.

According to one or more example embodiments of the present disclosure, the memory 218 may include a reference path identifier 220, a decomposition converter 222, a cost calculator 224, and a path connecter 226. Each of the reference path identifier 220, the decomposition converter 222, the cost calculator 224, and the path connecter 226 may be implemented in software and/or firmware, for example, as instructions stored in the memory 218 and executed by the processor 216 (or the processing circuit 214), and/or may be implemented as one or more special purpose circuits, for example, such as an ASIC, one or more FPGAs, a group of processing components, or other suitable electronic processing components. The reference path identifier 220, the decomposition converter 222, the cost calculator 224, and the path connecter 226 may be configured to generate the navigational path NP according to one or more of the methods shown in FIGS. 3 through 9 discussed in more detail below.

Figure 3:
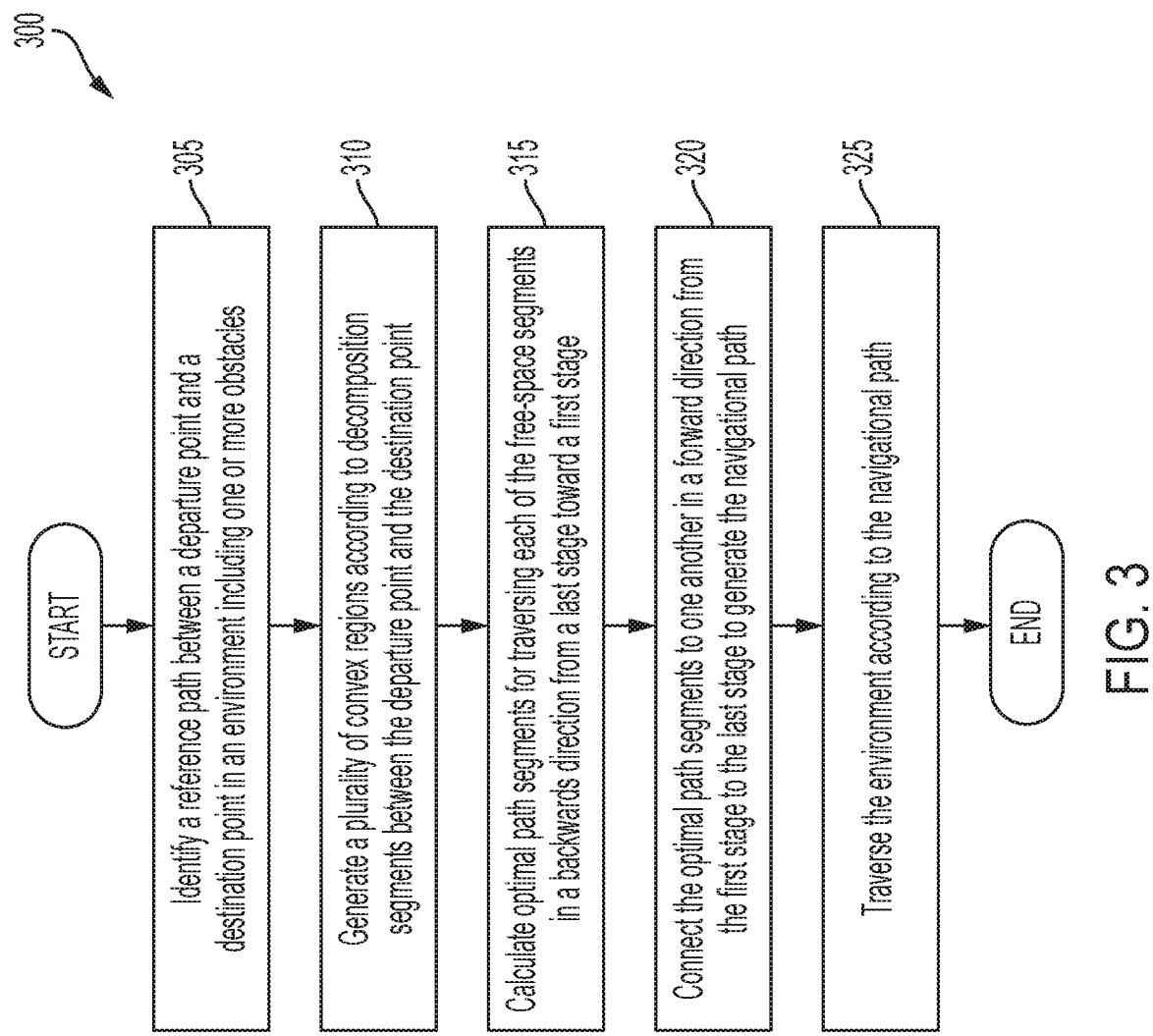
FIG. 3 is a flow diagram of a method of autonomous motion planning, according to one or more example embodiments of the present disclosure.

FIG. 3 is a flow diagram of a method of autonomous motion planning, according to one or more example embodiments of the present disclosure. However, the present disclosure is not limited to the sequence or number of the operations of the method 300 shown in FIG. 3, and can be altered into any desired sequence or number of operations as recognized by a person having ordinary skill in the art. For example, in some embodiments, the order may vary, or the method 300 may include fewer or additional operations. Further, the operations shown in the method 300 may be performed by any suitable one of the components or any suitable combination of the components of those of one or more example embodiments described herein.

Referring to FIGS. 1 through 3, in some embodiments, the motion planner 204 may identify a reference path (also referred to as a reference curve) RP between a departure point A and a destination point B in an environment (e.g., real or virtual) 100 including one or more obstacles 102 at block 305. The reference path RP may correspond to a desired path or curve (e.g., a target path or curve, an optimal path or curve, a smooth path or curve, or a shortest path or curve) connecting the departure point A and the destination point B to each other, irrespective of any obstacles (e.g., static objects, slow-moving objects, and/or the like) 102 that may surround or obstruct (e.g., that may be located in or adjacent to) the reference path RP. For example, in some embodiments, the reference path identifier 220 may receive the reference path RP from an external system (e.g., a third party system), or may determine (e.g., may generate) the reference path RP according to data from one or more of the sensors 202 and/or the map data 228. In the latter case, for example, the reference path identifier 220 may receive a representation of the environment 100 (e.g., from the sensors 202 and/or the map data 228), and may connect the departure point A to the destination point B using any suitable method or algorithm to generate the reference path RP.

In some embodiments, the motion planner 204 may generate a plurality of convex regions according to decomposition segments between the departure point A and the destination point B at block 310. For example, as will be discussed in more detail below with reference to FIGS. 4 and 5, the decomposition converter 222 may divide spaces relative to the reference path RP between the departure point A and the destination point B into a convex set including free-space segments (e.g., unoccupied space segments) and occupied-space segments (e.g., segments containing the obstacles). An ordering (e.g., a partial ordering) of the free-space segments between the departure point A and the destination point B may generate a directed acyclic graph (DAG) having nodes corresponding to the free-space segments, and aligned edges corresponding to windows (e.g., rays) connecting the free-space segments to one another. For example, a first free space segment may be between the departure point A and a corresponding right window (e.g., a corresponding right edge), and the right window of the first free space segment may correspond to a left window (e.g., a corresponding left edge) of a second free space segment, and so on and so forth, until a last free space segment may be between a last window and the destination point B.

According to one or more example embodiments of the present disclosure, as will be discussed in more detail below with reference to FIGS. 6A-9, the generated DAG may be used as a basis for dynamic programming (e.g., discrete dynamic programming or continuous dynamic programming). For example, in some embodiments, each of the free-space segments may correspond to a convex optimization sub-problem for determining a desired (e.g., an optimal or near optimal) path segment for traversing a corresponding free-space segment. In this case, according to one or more example embodiments of the present disclosure, because the destination point B is fixed and known, the cost calculator 224 may use a suitable discrete dynamic programming method (e.g., as discussed in more detail with reference to FIGS. 6A and 7) or a suitable continuous dynamic programming method (e.g., as discussed in more detail with reference to FIGS. 8A to 9) to calculate optimal path segments for traversing each of the free-space segments in a backward direction from a last stage toward a first stage at block 315.

For example, the last stage may correspond to a last free-space segment between a last window and the destination point B, and the destination point B may be used as a fixed reference point for calculating an optimal path segment originating from a point-heading pair on the last window and ending at the destination point B. The point-heading pair on the last window may then be used as the fixed reference point of a previous adjacent free-space segment (or one or more previous adjacent free-space segments) to calculate an optimal path segment originating from a left window of the previous adjacent free-space segment and ending at the fixed reference point of the last window, and so on and so forth, such that optimal path segments traversing the stages (e.g., the free-space segments) may be determine and connected to each other in the forward direction. However, the present disclosure is not limited thereto, and as discussed in more detail below with reference to FIG. 6B, in some embodiments the motion planner 204 may calculate the desired (e.g., optimal or near-optimal) path segments in the forward direction (e.g., from a first window towards a last window using the departure point A or the like as the reference point).

In some embodiments, it should be appreciated that a window may be connected to two or more windows. For example, if an object is located in the reference path RP, one possible path segment may be to maneuver around a first side of the object, and another possible path segment may be to maneuver around an opposite side of the object. In this case, the motion planner 204 may calculate and maintain two different possible optimal path segments through the free-space segments, one for each possible path segment. In this case, the generated DAG may have a split at a node connecting one window to two different windows, and the motion planner 204 may maintain optimal values for the two different windows.

In some embodiments, after each of the optimal path segments are determined for each of the free-space segments, the motion planner 204 (e.g., the path connecter 226) may connect the optimal path segments to one another in a forward direction (e.g., a direction from the departure point A to the destination point B) to generate the navigational path NP at block 320. In some embodiments, the motion planner 204 may provide the generated navigational path NP to the motion controller 206 to traverse the environment 100 according to the navigational path NP at block 325, and the method 300 may end. For example, in some embodiments, the motion controller 206 may control the movement of the autonomous system 200 along the generated navigational path NP using, for example, one or more of the sensors 202, the map data 228, and/or the like to control current positions, heading directions, speed, and/or the like of the autonomous system 200 while progressing along the navigational path NP.

Figure 4:
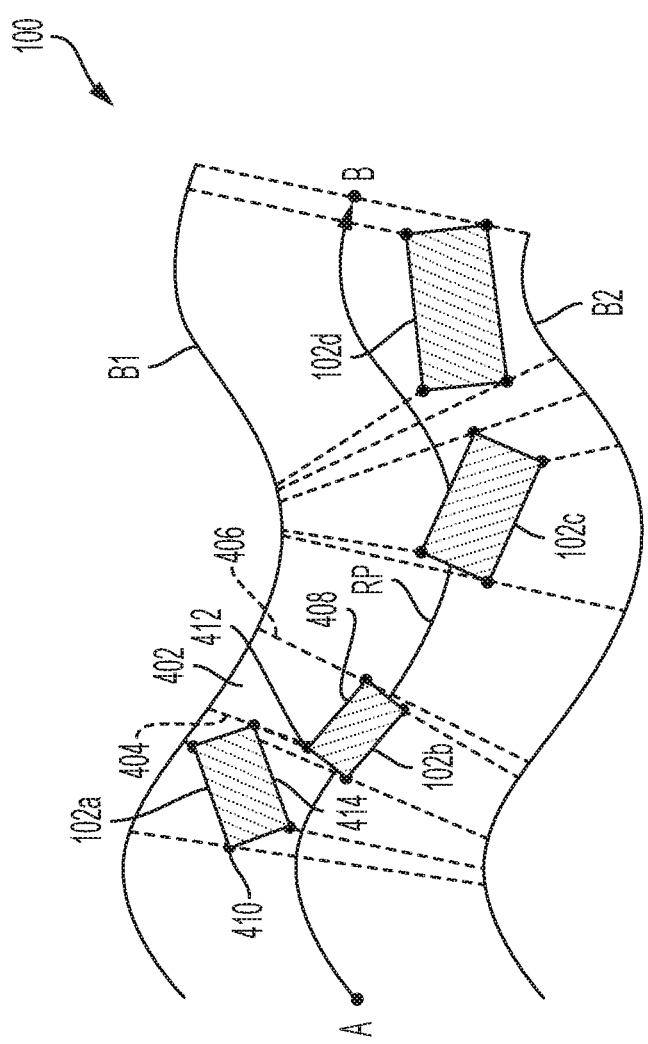
FIG. 4 is a diagram illustrating decomposition segments in a Euclidean coordinate system, according to one or more example embodiments of the present disclosure.
Figure 5:
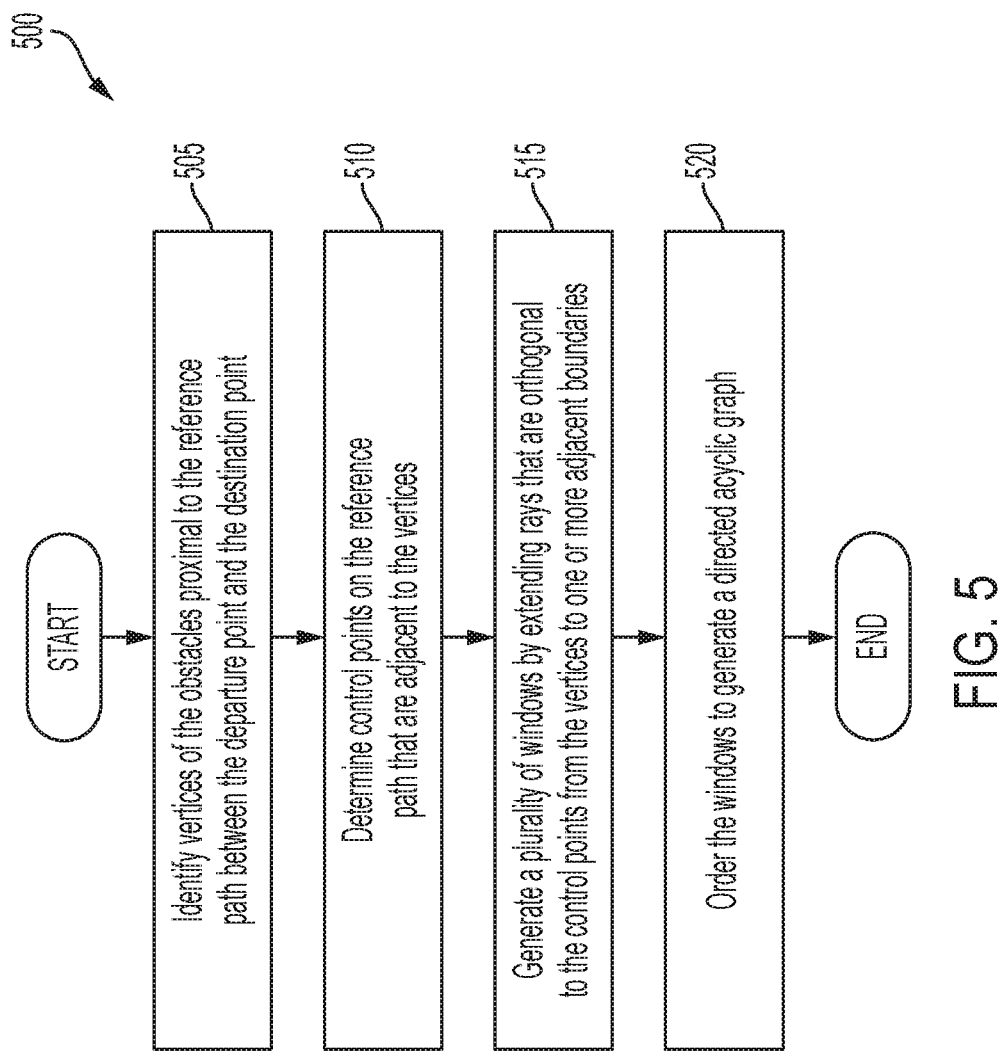
FIG. 5 is a flow diagram of a method of vertical decomposition, according to one or more example embodiments of the present disclosure.

FIG. 4 is a diagram illustrating decomposition segments in a Euclidean coordinate system, according to one or more example embodiments of the present disclosure. FIG. 5 is a flow diagram of a method of vertical decomposition, according to one or more example embodiments of the present disclosure. However, the present disclosure is not limited to the sequence or number of the operations of the method 500 shown in FIG. 5, and can be altered into any desired sequence or number of operations as recognized by a person having ordinary skill in the art. For example, in some embodiments, the order may vary, or the method 500 may include fewer or additional operations. Further, the operations shown in the method 500 may be performed by any suitable one of the components or any suitable combination of the components of those of one or more example embodiments described herein.

Referring to FIGS. 2 and 4, in some embodiments, the motion planner 204 may divide the spaces relative to the reference path RP between the departure point A and the destination point B to generate a plurality of convex regions including free-space segments (e.g., indicated by white cells) and occupied-space segments (e.g., indicated by shaded cells). For example, in some embodiments, the motion planner 204 (e.g., the decomposition converter 222) may use a vertical decomposition technique to generate the free-space segments and the occupied-space segments by casting a ray (e.g., indicated by dashed lines) from each vertex of an obstacle of interest 102 to a boundary (e.g., a path boundary B1 or B2, or an edge or surface of an adjacent obstacle 102). In some embodiments, the motion planner 204 may generate a coarse perimeter around the obstacle of interest 102 to have any suitable polygonal shape, for example, such as a triangle, a quadrilateral, a pentagon, and/or the like, having a suitable number of vertices to cast the rays therefrom, in response to the obstacle of interest 102 having a shape that does not include vertices or that does not include a suitable number of vertices at a periphery thereof, for example, such as a circle shape, an oval shape, an elliptical shape, a teardrop shape, and/or the like.

As shown in FIG. 4, in some embodiments, each of the rays may be orthogonal to the reference path RP, such that each of the free-space segments may be orthogonal to the reference path RP. In other words, each of the free-space segments may be bounded on the left side and the right side thereof by corresponding rays, and on the top side and bottom side thereof by corresponding boundaries (e.g., the path boundaries B1 and B2, edges or surfaces of adjacent obstacle 102, and/or the like). For a non-limiting example, the free-space segment 402 is shown as being bounded on a left side thereof by a ray 404, a right side thereof by a ray 406, a top side thereof by a path boundary B1, and a bottom side thereof by an edge or surface 408 of the obstacle 102b. The path boundaries B1 and B2 may be parallel or substantially parallel to the reference path RP, and may correspond to physical boundaries (e.g., lane lines on a road), or may correspond to a suitable distance from the reference path RP (e.g., that the autonomous system 200 may travel to avoid colliding with obstacles for a corresponding reference path RP). In some embodiments, the path boundaries B1 and B2 may be at opposite sides of an equidistance from the reference path RP, such that the reference path RP is between the path boundaries B1 and B2.

In some embodiments, the motion planner 204 may order (e.g., may partially order) the free-space segments to generate the DAG. For example, in some embodiments, the motion planner 204 (e.g., the decomposition converter 222) may sequentially align the rays (e.g., the edges or the windows) of the free space segments in a direction from the departure point A to the destination point B such that the free-space segments correspond to sequential nodes of the DAG and the rays correspond to edges of the DAG connecting the nodes. In this case, the Euclidean coordinate system shown in FIG. 4 may be converted into a curvilinear coordinate system corresponding to each sequential free-space segment (e.g., as shown in FIG. 6), such that computation of the path segments to traverse each of the free-space segments may be simplified. For example, because each of the free-space segments are convex regions that are devoid of any obstacles 102, the computation of the path segments through each of the free-space segments may correspond to a set of convex optimization computational problems, which may require less computational resources to compute than those of non-convex optimization computational problems. However, the present disclosure is not limited thereto, and in other embodiments, the motion planner 204 may sequentially align the rays of the free space segments in a direction from the destination point B to the departure point A as needed or desired.

In more detail, referring to FIGS. 2, 4, and 5, in some embodiments, the motion planner 204 may identify vertices of the obstacles 102 proximal to the reference path RP between the departure point A and the destination point B at block 505. For example, in some embodiments, the decomposition converter 222 may use the map data 228 and/or data (e.g., image data, TOF data, and/or the like) from one or more of the sensors 202 to identify the obstacles 102 and each of the vertices thereof. In some embodiments, the motion planner 204 may determine control points on the reference path RP that are adjacent to the vertices at block 510. For example, in some embodiments, for each vertex of the objects 102, the decomposition converter 222 may identify a control point corresponding to a nearest point on the reference path RP such that a vector extending from a corresponding vertex to the control point is orthogonal to the reference path RP.

In some embodiments, the motion planner 204 may generate a plurality of windows by extending rays that are orthogonal to the control points relative to the reference path RP from the vertices to one or more adjacent boundaries at block 515. For example, in some embodiments, for each of the vertices, the decomposition converter 222 may extend a ray outward from the vertex to a corresponding control point on the reference path RP until one or more closest boundaries are reached. The ray may be orthogonal to the reference path RP at the control point. The boundaries may correspond to a path boundary B1 or B2, or a side or surface of an obstacle 102. For example, as shown in the non-limiting embodiment of FIG. 4, a ray orthogonal to the reference path RP extending outward from a vertex 410 of the obstacle 102a may be extended toward the boundary B1 until it reaches the boundary B1 at a top end thereof, and toward the boundary B2 unit it reaches the boundary B2 at a bottom end thereof. On the other hand, a ray orthogonal to the reference path RP extending outward from a vertex 412 of the obstacle 102b may be extended toward the boundary B1 until it reaches a side or surface 414 of the obstacle 102a at a top end thereof, but may not be extended towards the boundary B2 at a bottom end thereof as it has already reached the obstacle 102b.

In some embodiments, the motion planner 204 may order (e.g., may partially order) the windows (e.g., the rays) to generate the DAG, and the method 500 may end. The DAG may then be used to calculate costs of one or more path segments (e.g., according to a position along the window and a heading direction) for traversing from window to window using a dynamic programming method, as will be discussed in more detail below with reference to FIGS. 6A through 9. For example, as discussed in more detail below with reference to FIGS. 6A to 7, a discrete dynamic programming method may be used to calculate the costs according to a discrete sampling of point-heading pairs along each of the windows to generate the navigational path NP, or as discussed in more detail below with reference to FIGS. 8 and 9, a continuous dynamic programming method may be used to calculate the costs according to a continuous sampling of point-heading pairs along each of the windows to generate the navigational path NP.

Figure 6A:
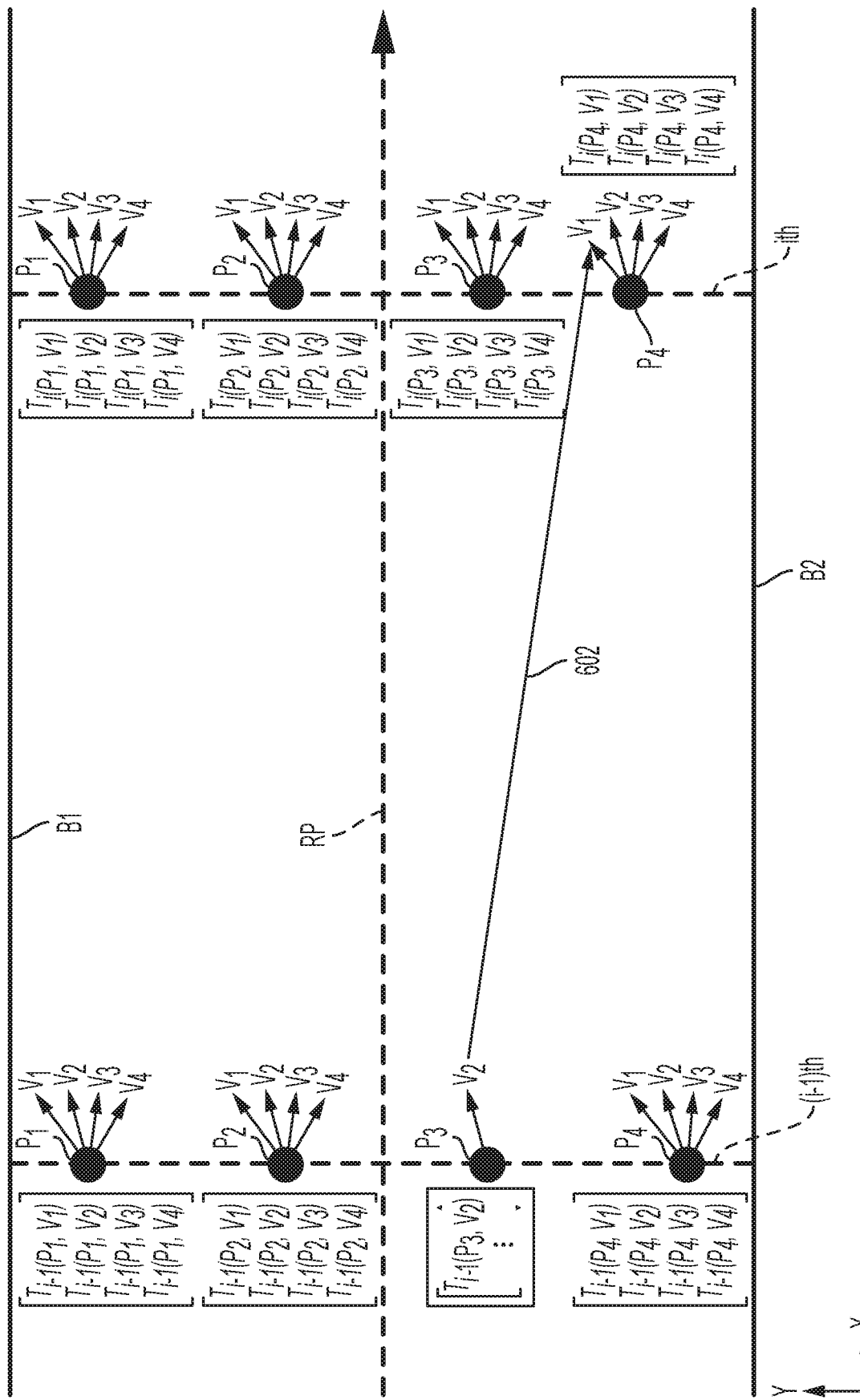
FIGS. 6A-6B are diagrams illustrating a free-space segment in a curvilinear coordinate system, according to one or more example embodiments of the present disclosure.
Figure 6B:
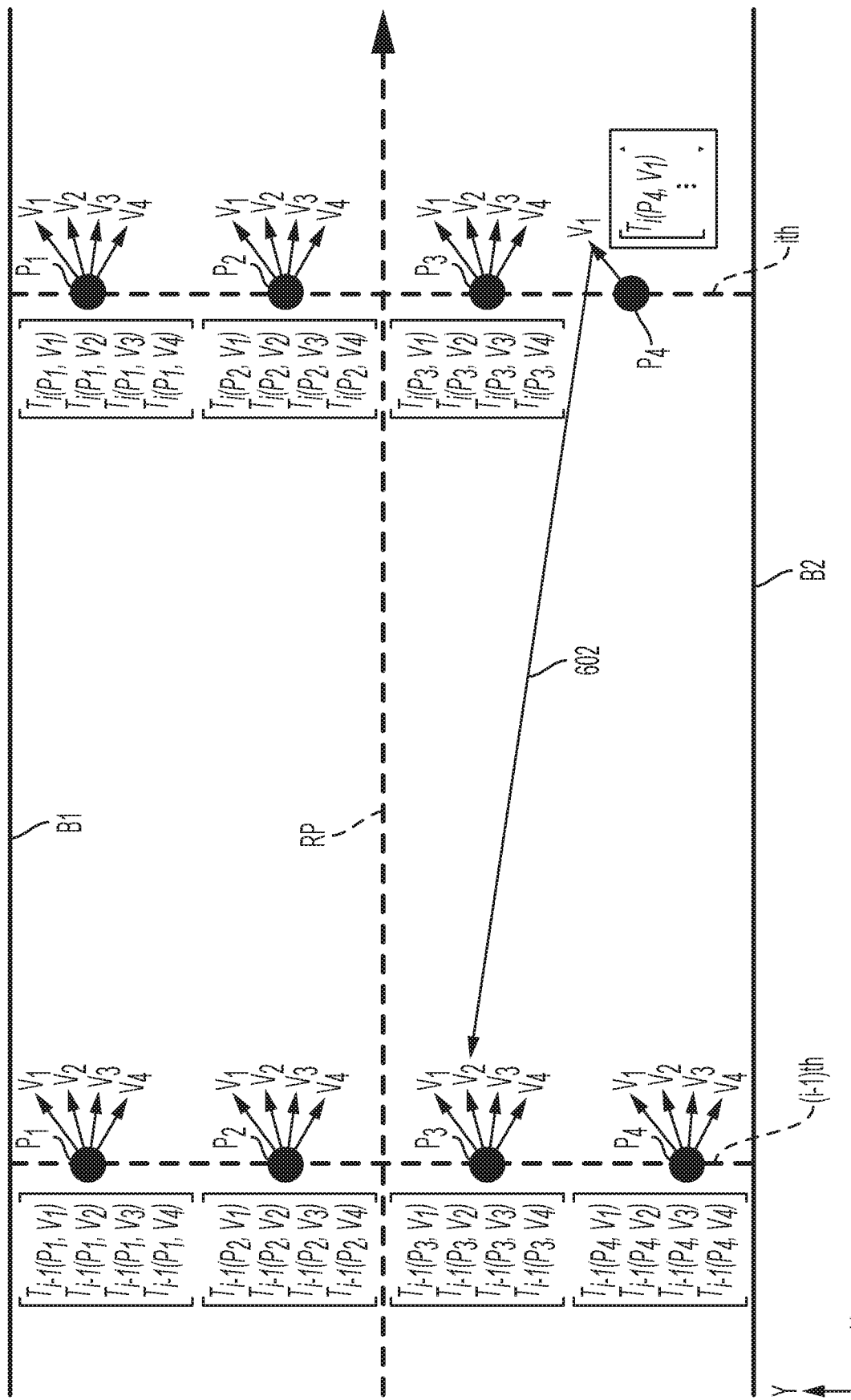
Figure 7:
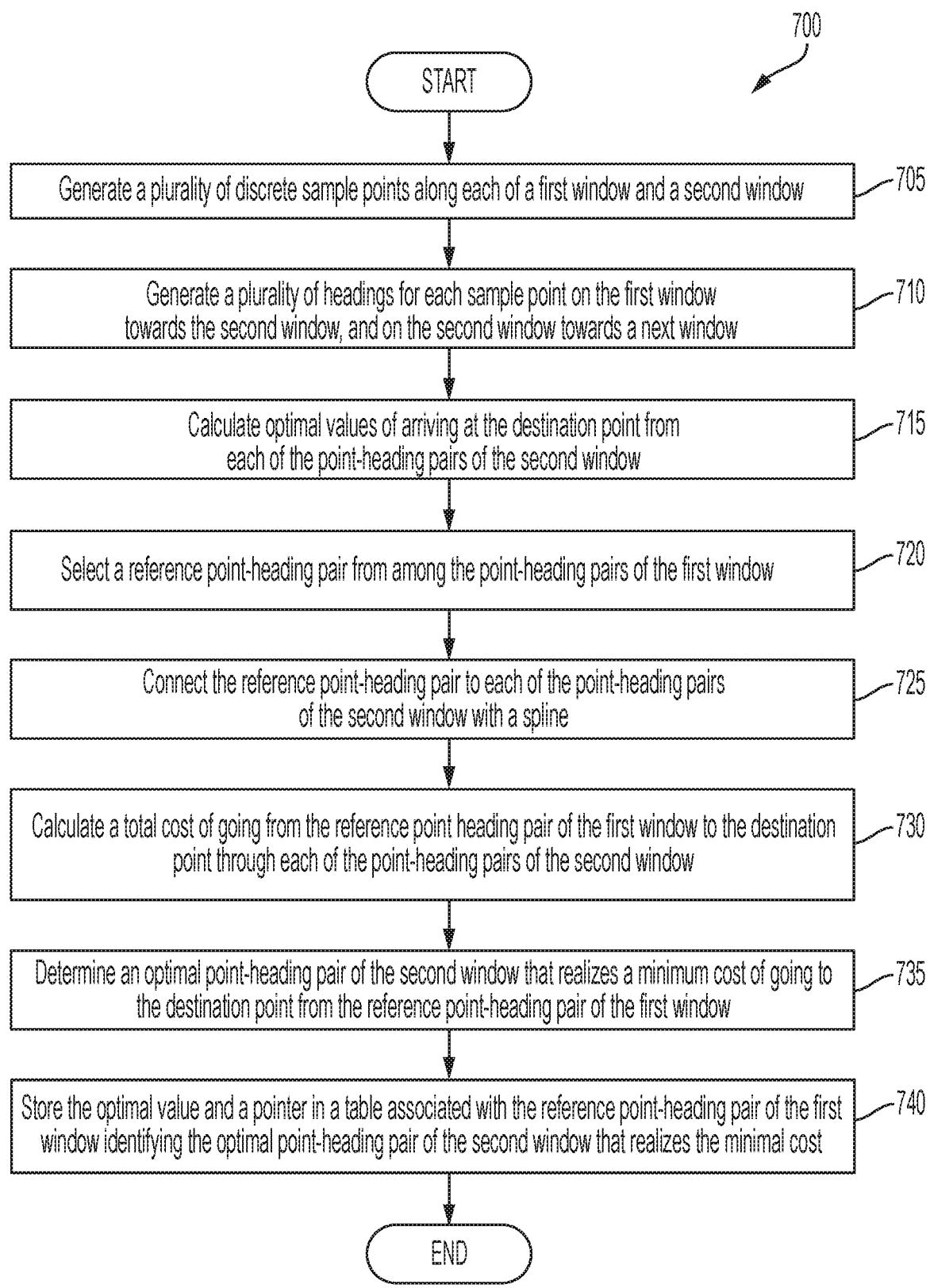
FIG. 7 is a flow diagram of a method of discrete optimization dynamic programming, according to one or more example embodiments of the present disclosure.

FIGS. 6A and 6B are diagrams illustrating a free-space segment in a curvilinear coordinate system, according to one or more example embodiments of the present disclosure. FIG. 7 is a flow diagram of a method of discrete optimization dynamic programming, according to one or more example embodiments of the present disclosure. However, the present disclosure is not limited to the sequence or number of the operations of the method 700 shown in FIG. 7, and can be altered into any desired sequence or number of operations as recognized by a person having ordinary skill in the art. For example, in some embodiments, the order may vary, or the method 700 may include fewer or additional operations. Further, the operations shown in the method 700 may be performed by any suitable one of the components or any suitable combination of the components of those of one or more example embodiments described herein.

Referring to FIGS. 2 and 6A to 6B, when the motion planner 204 (e.g., the decomposition converter 222) orders the free-space segments to generate the DAG, the Euclidean coordinate system shown in FIG. 4 may be converted into a curvilinear coordinate system for each of the free-space segments as shown in FIGS. 6A and 6B, such that a base axis X is defined as an arc length along the reference path RP, and another axis Y is defined as a transverse distance from the reference path RP. The free-space segments may correspond to the nodes of the DAG, and the windows may correspond to edges of the nodes in the DAG. Thus, curved lines in the Euclidean coordinate system shown in FIG. 4 may be linearly converted to be straight in the free-space segments of the curvilinear coordinate system shown in FIGS. 6A and 6B, which may simplify computation of the optimal paths segments through the free-space segments.

FIGS. 6A and 6B show a non-limiting example of a free-space segment bounded between a left window (i−1)th (e.g., an (i−1)th ray), a right window ith (e.g., an ith ray), the first path boundary B1, and the second path boundary B2 in the curvilinear coordinate system. A segment of the reference path RP is shown in a direction from the left window (I−1)th to the right window ith as shown in FIGS. 6A and 6B. According to one or more example embodiments, the motion planner 204 may use a discrete dynamic programming method to determine an optimal (or near optimal) path segment for traversing each of the free-space segments in a backward direction from a corresponding right window ith to a corresponding left window (i−1)th as will be described in more detail with reference to FIG. 6A, or in a forward direction from a corresponding left window (i−1)th to a corresponding right window ith as will be described with reference to FIG. 6B. The optimal (or near optimal) path segments for traversing across each of the free space segments may be determined based on costs associated with a plurality of possible path segments originating from a plurality of discrete position-heading pairs (e.g., discrete point-heading pairs) along the left window (i−1)th and ending at a discrete position-heading pair along the right window ith.

For example, the costs may correspond to a notion of merit or a weight for selecting one potential path segment over another, for example, such as based on a distance from the reference path RP, a time it takes to traverse the free-space segment, a smoothness of the path segment, and/or the like. For example, the cost calculator 224 may compute optimal values and transition costs for each of the potential path segments for traversing the free-space segments between the windows (e.g. the edges) thereof relative to the reference path RP. In other words, in some embodiments, the cost calculator 224 may calculate costs of each of the potential path segments for traversing the free-space segments from a corresponding left window (i−1)th to a corresponding right window ith according to various positions and heading directions for each discrete sampled point-heading pair along the windows of the free-space segments.

For example, in some embodiments, in the backwards direction, as shown in FIG. 6A, the discrete dynamic programming method may determine a path through the environment 100 by calculating a minimum cost from among a plurality of possible path segments for traversing each of the free-space segments with respect to the reference path RP starting from a last stage (e.g., a free-space segment at the destination B) and moving backwards toward a first stage (e.g., a free-space segment at the origin A). In this case, for each of a plurality of position-heading pairs along the right window ith of the last stage, a minimum cost to reach the destination point B with respect to the reference path RP may be calculated and stored as a location of the destination point B is known, and a position-heading pair from among the position-heading pairs of the right window ith of the last stage having the minimum cost for arriving at the destination point B may be used as a constraint for identifying minimum cost realizing position-heading pairs of previous windows (e.g., of the left window (i−1)th). For example, if the point-heading pair (P4, V1) on the right window ith is determined to realize the minimum cost of arriving at the destination point B (or an identified reference point-heading pair of a next window (i+1)th) with respect to the reference path RP, then a cost of a point-heading pair (e.g., (P3, V2)) along the left window (i−1)th may be calculated to realize a total minimum cost of arriving at the destination point B through the point-heading pair (P4, V1) on the right window ith. In this case, the optimal value of the point-heading pair (e.g., (P3, V2)) on the left window (i−1)th that realizes the minimum cost of traversing a present free-space segment (e.g., a present stage) may be stored and used for the right window of a previous free-space segment (e.g., a previous stage), and in this way, going backwards, point-heading pairs along each window for realizing the minimum cost of arriving at the destination point B through a reference point-heading pair of a next window may be identified, such that a suitable (e.g., an optimal or near optimal) path segment through each of the free-space segments relative to the reference path RP may be determined and connected to each other in a forward direction to generate the navigational path NP.

For example, referring to FIGS. 2, 6A, and 7, in some embodiments, the motion planner 204 may generate a plurality of discrete sample points P1 to P4 along each of a first window (e.g., the left window (i−1)th) and a second window (e.g., the right window ith) at block 705. For example, the cost calculator 224 may sample first through fourth sample points P1 to P4 across each of the left window (i−1)th and the right window ith. Each of the discrete sample points P1 to P4 may correspond to a position (e.g., a starting position or an ending position) along the windows (i−1)th and ith. In some embodiments, the plurality of sample points may be spaced apart from each other every ε meters (m), where ε is greater than 0.

In some embodiments, the motion planner 204 may generate a plurality of headings (e.g., heading directions) V1 to V4 for each sample point P1 to P4 on the first window towards the second window, and on the second window towards a next window (or towards a destination point B) block 710. For example, in some embodiments, the cost calculator 224 may sample first through fourth heading directions V1 to V4 for each of the sample points P1 to P4 along each of the left window (i−1)th and the right window (ith). In some embodiments, each of the plurality of heading directions V1 to V4 may correspond to a tangent through the corresponding sample point spaced every δ degrees from each other, where δ is greater than 0.

As would be appreciated by those having ordinary skill in the art, each of ε and δ may correspond to tuning parameters that may be selected according to a desired balance between accuracy and computational resource requirements. For example by increasing ε and/or δ, accuracy may be increased as more sample point-heading pairs along the windows may be generated, but may also increase computational resource requirements as more costs may be calculated to identify an optimal (or near optimal) path segment from among the sample point-heading pairs across the corresponding window.

Accordingly, while FIG. 6A shows a non-limiting example illustrating four sample points P1 to P4 each having four heading directions V1 to V4 for each of the windows ith and (i−1)th, the present disclosure is not limited thereto, and any suitable or desired number of sample points and heading directions may be generated. For example, to have an approximation to a "true" optimal solution with "order epsilon accuracy" for each of the windows ith and (i−1)th according to a suitable or desired running time for cost calculations, the running time may be a function of 1/ε and 1/δ for a (1+O(ε)+O(δ)) approximation, where O is a big-O notation.

In some embodiments, the motion planner 204 may calculate optimal values of arriving at the destination point B from each of the point-heading pairs of the second window (e.g., the ith window) at block 715. For example, in some embodiments, the cost calculator 224 may calculate optimal values for each of the point-heading pairs (P1, V1) to (P4, V4) of the right window to reach the destination point B through one or more reference point-heading pairs of one or more next windows of one or more previous stages. Here, because the discrete dynamic programming method determines the optimal path segments moving backwards (e.g., from the last window towards the first window), the previous stage may refer to one or more previously examined windows, which in this example, may be one or more next windows with respect to the execution of the path. For example, in a finite sequential decision task the merit of all possible first decisions may be evaluated and stored. For each second decision, the merit of each of the second decisions may be evaluated according to the merit for each of the first potential decisions. In this case, computational complexity may be exponentially increased unless certain sequences of decisions converge to a common state. This identification of sequences of decisions with a common state is what is referred to as the optimal substructure (e.g., the optimal values), and may make dynamic programming efficient. In some embodiments, the optimal values for each of the point-heading pairs (P1, V1) to (P4, V4) of the right window ith may be stored in a table Ti associated with the right window ith. Accordingly, in some embodiments, the optimal values associated with each of the point-heading pairs (P1, V1) to (P4, V4) of the left window (i−1)th may be calculated based on optimal values stored for previous stages (e.g., next windows) plus a transition cost of arriving at one or more point-heading pairs of a next window (e.g., the right window ith).

In some embodiments, a reference point-heading pair from among the point-heading pairs of the first window may be selected at block 720. For example, in some embodiments, as shown in FIG. 6A, the motion planner 204 (e.g., the cost calculator 224) may select the point heading pair (P3, V2) along the left window (i−1)th to calculate the minimal cost for traversing across the free-space segment to each of the point-heading pairs along the right window ith.

In some embodiments, the reference point heading pair may be connected to each of the point-heading pairs of the second window with a spline at block 725. For example, in some embodiments, the motion planner 204 (e.g., the cost calculator 224) may connect the point-heading pair (P3, V2) of the left window (i−1)th to each of the point-heading pairs (P1, V1) to (P4, V4) of the right window ith using a cubic spline.

In some embodiments, a total cost of going from the reference point heading pair of the first window to the destination point B through each of the point-heading pairs (P1, V1) to (P4, V4) of the second window may be calculated at block 730. For example, the motion planner 204 (e.g., the cost calculator 224) may calculate the total cost according to the stored optimal values of the second window and a transition cost of the spline with respect to a reference curve. The transition cost may refer to the cost associated with traversing a path segment (e.g., between two windows), rather than a cost of the entire navigational path NP. For example, a cubic spline z connecting a sample point q1 and heading direction t1 on a first window (i−1)th to a sample point q2 and heading direction t2 of a second window ith may be denoted as z(q1, t1, q2, t2). A cost Ci−1 of the cubic spline z with regards to the reference path RP may be denoted as Ci−1(r, z), where r represents a reference curve corresponding to the reference path RP. In this case, the cost Ci−1 may correspond to a deviation amount from the reference path RP of the cubic spline z connecting the two point-heading pairs (q1, t1) and (q2, t2) of the cubic spline z, but the present disclosure is not limited thereto.

For a non-limiting example, a total cost to go to the destination point B from the reference point-heading pair (P3, V2) of the first window (i−1)th through each of the point-heading pairs (P1, V1) to (P4, V4) of the second window ith may be calculated through exhaustive enumeration over the discrete set (P, V) of the point-heading pairs of the second window ith. For example, for the reference point-heading pair (P3, V2) on the first window (i−1)th, the total cost to go $T_{i-1}(p_3, v_2)$ to the destination point B through the point-heading pairs of the second window ith may be calculated according to Equation 1-1 below.

$$T_{i-1}(p_3, v_2) = \min_{p,v}\{T_i(p,v) + C_{i-1}(r, z(p_3, v_2, p, v))\}, \quad \text{Equation 1-1}$$

where $\min_{p,v}$ is an annotation for recursively minimizing over the discrete set of point-heading pairs along the second window ith, $T_i(p,v)$ corresponds to the stored aggregate optimal value of the cost to go to the destination point B from a corresponding point-heading pair (p, v) on the second window ith through one or more point-heading pairs along one or more next windows, and $C_{i-1}(r, z(p_3, v_2, p, v_1))$ corresponds to the transition cost $C_i$ of the cubic spline $z(p_3, v_2, p, v_1)$ connecting the reference point heading pair (p3, v2) on the first window (i−1)th to a corresponding point-heading pair on the second window ith relative to the reference curve r corresponding to the reference path RP. In some embodiments, as shown in FIG. 6A, through exhaustive enumeration of Equation 1-1 for each of the point-heading pairs (P1, V1) to (P4, V4) on the second window ith, an optimal (or near-optimal) point heading pair (e.g., P4, V1) of the second window ith that realizes the minimum cost of going to the destination point B from the reference point-heading pair (P3, V2) of the first window (i−1)th may be determined (e.g., may be estimated or approximated) at block 735.

In some embodiments, the calculated optimal value and a pointer may be stored in a table associated with the reference point-heading pair of the first window (i−1)th identifying the optimal point-heading pair of the second window ith that realizes the minimum cost at block 740. For example, as shown in FIG. 6A, the calculated optimal value according to Equation 1-1 and a pointer 602 may be stored in the table $T_{i-1}(p_3, v_2)$ associated with the reference point-heading pair (P3, V2) of the first window (i−1)th identifying the point heading pair (P4, V1) of the second window ith that realizes the minimum cost of traversing the free-space segment according to Equation 1-1.

In some embodiments, the method 700 may be repeated for each point-heading pair along the first window such that the optimal values thereof may be calculated and stored in the corresponding tables $T_{i-1}(p,v)$ according to Equation 1-1, and the stored optimal values may be used to calculate the optimal path segments of a previous window. For example, the motion planner 204 may repeat the method 700 of FIG. 7 for each next stage (e.g., each previous free-space segment) to identify optimal path segments between a corresponding first window and a corresponding second window for each previous free-space segment that realizes the minimum cost of going from a reference point-heading pair of a corresponding first window to the destination point B through a point heading pair of a corresponding second window, such that the method 700 may end.

In some embodiments, after determining all of the optimal path segments through the windows in a backward direction, the path connecter 226 may connect each of the optimal path segments (e.g., according to the stored pointers) in the forward direction to generate the navigational path NP. In some embodiments, the path connecter 226 may apply a smoothing operation to the generated navigational path NP as needed or desired, but the present disclosure is not limited thereto. However, because the navigational path NP is generated based on the free-space segments and the smooth reference path RP, the smoothing operation may not substantially increase the risk of generating a path that deviates from obstacle avoidance.

As another example, in some embodiments, referring to FIG. 6B, the motion planner 204 (e.g., the cost calculator 224) may calculate the optimal values in a forward direction, rather than in a backward direction. In this case, the stored optimal values are calculated for arriving at each point-heading pair of the first window (i−1)th from the departure point A through reference point-heading pairs of previous windows, and a total cost for arriving at a reference point-heading pair of the second window ith may be calculated according to the stored optimal values of the first window (i−1)th and the transition cost of traversing across a corresponding free-space segment.

In more detail, in the forward direction, the discrete dynamic programming method may determine a path through the environment 100 by calculating a minimum cost from among a plurality of possible path segments for traversing each of the free-space segments with respect to the reference path RP starting from a first stage (e.g., a free-space segment at the origin A) and moving forwards toward a last stage (e.g., a free-space segment at the destination B). In this case, for each of a plurality of position-heading pairs along the left window (i−1)th of the first stage, a minimum cost originating from the departure point A with respect to the reference path RP and ending at the point heading pair along the left window (i−1)th may be calculated and stored as a location of the departure point A is known, and may be used as a constraint for identifying minimum cost realizing position-heading pairs of next windows (e.g., of the right window ith). For example, if the point-heading pair (P3, V2) on the left window (i−1)th is determined to realize the minimum cost originating from the departure point A (or an identified reference point-heading pair of a previous window (i−2)th) with respect to the reference path RP and ending at the left window (i−1)th, then a cost of a point-heading pair (e.g., (P4, V1)) along the right window ith may be calculated that realizes a total minimum cost of arriving at the right window ith originating from the departure point A and through the point-heading pair (P3, V2) on the left window (i−1)th. In this case, an optimal value of the point-heading pair (e.g., (P4, V1)) on the right window ith that realizes the minimum cost of traversing a present free-space segment (e.g., a present stage) may be stored and used for the left window of a next free-space segment, and in this way, going forwards, point-heading pairs along each window for realizing the minimum cost of arriving at next windows from the departure point A through reference point-heading pairs of previous windows may be identified, such that a suitable (e.g., an optimal or near optimal) path segment through each of the free-space segments relative to the reference path RP may be determined and connected to each other to generate the navigational path NP.

For a non-limiting example, in the forward direction, a total cost of arriving at a reference point-heading pair (P4, V1) of the second window ith from the departure point A through each of the point-heading pairs (P1, V1) to (P4, V4) of the first window (i−1)th may be calculated through exhaustive enumeration over the discrete set (P, V) of the point-heading pairs of the first window (i−1)th. For example, for the reference point-heading pair (P4, V1) on the second window ith, the total cost of arrival $T_i(p_4, v_1)$ thereto through the point-heading pairs of the first window (i−1)th may be calculated according to Equation 1-2 below.

$$T_i(p_4,v_1)=\min_{p,v}\{T_{i-1}(p,v)+C_i(r;z(p,v,p_4,v_1))\}, \quad \text{Equation 1-2}$$

where $\min_{p,v}$ is an annotation for recursively minimizing over the discrete set of point-heading pairs along the first window (i−1)th, $T_{i-1}(p,v)$ corresponds to the stored aggregate optimal value of arriving at the point-heading pair (p, v) of the first window (i−1)th from the departure point A and through one or more point-heading pairs along one or more previous windows, and $C_i(r, z(p, v, p_4, v_1)$ corresponds to the cost $C_i$ of the cubic spline $z(p, v, p_4, v_1)$ connecting the corresponding point-heading pair (p, v) on the first window (i−1)th to the reference point-heading pair (p4, v1) of the second window ith relative to the reference curve r corresponding to the reference path RP. In some embodiments, as shown in FIG. 6B, through exhaustive enumeration of Equation 1-2 for each of the point-heading pairs (P1, V1) to (P4, V4) on the first window (i−1)th, an optimal (or near-optimal) point heading pair (e.g., P3, V2) of the first window (i−1)th that realizes a minimum cost of arriving at the reference point-heading pair (P4, V1) of the second window ith from the departure point A may be determined (e.g., may be estimated or approximated).

In some embodiments, the calculated optimal value and a back pointer may be stored in a table associated with the reference point-heading pair of the second window ith identifying the optimal point-heading pair of the first window (i−1)th that realizes the minimum cost. For example, as shown in FIG. 6B, the calculated optimal value according to Equation 1-2 and a back pointer 602 may be stored in the table $T_i(p_4, v_1)$ associated with the reference point-heading pair (P4, V1) of the second window ith identifying the point heading pair (P3, V2) of the first window (i−1)th that realizes the minimum cost of traversing the free-space segment according to Equation 1-2.

In some embodiments, the optimal values for each point-heading pair along the second window ith may be calculated and stored in the corresponding tables $T_i(p,v)$ according to Equation 1-2, and the stored optimal values may be used to calculate the optimal path segments of a next window. For example, the motion planner 204 may calculate optimal values for each next stage (e.g., each next free-space segment) to identify optimal path segments between a corresponding first window and a corresponding second window for each next stage that realizes the minimum cost of arriving at a corresponding window from the departure point A through point-heading pairs of a corresponding first window to the reference point-heading pair of a corresponding second window. In some embodiments, the back pointers may be connected to each other in the forward direction to generate the navigational path NP. In some embodiments, the path connecter 226 may apply a smoothing operation to the generated navigational path NP as needed or desired, but the present disclosure is not limited thereto. However, because the navigational path NP is generated based on the free-space segments and the smooth reference path RP, the smoothing operation may not substantially increase the risk of generating a path that deviates from obstacle avoidance.

Figure 8A:
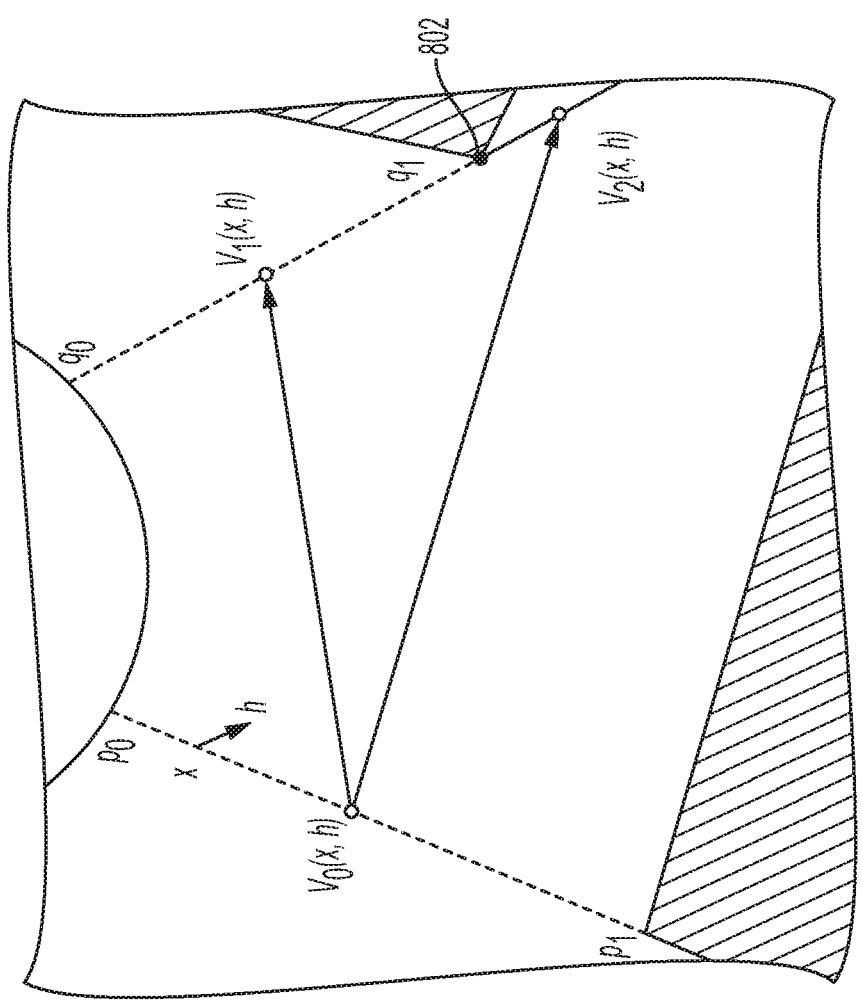
FIGS. 8A-8C are diagrams illustrating a free-space segment in a Euclidean coordinate system, according to one or more example embodiments of the present disclosure.
Figure 8B:
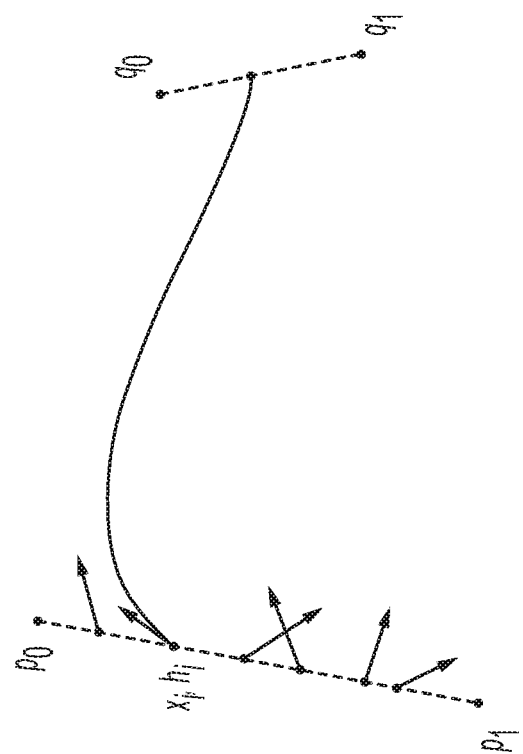
Figure 8C:
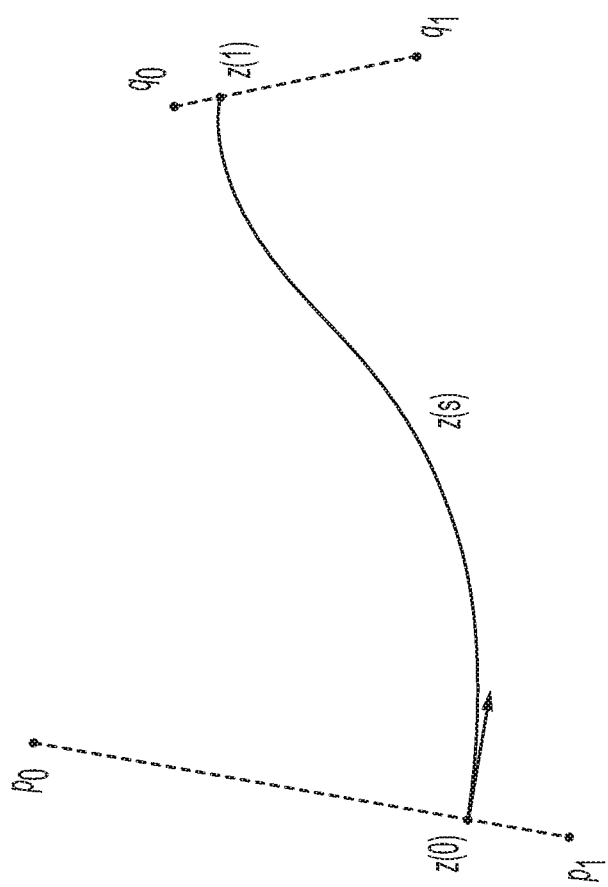

FIGS. 8A to 8C are diagrams illustrating a free-space segment in a Euclidean coordinate system, according to one or more example embodiments of the present disclosure. The free space segment shown in FIGS. 8A to 8C are shown in the Euclidean coordinate system for enhancement of understanding. For example, FIG. 8A shows that a left window (e.g., an ith window) $\overline{p_0p_1}$ of a free-space segment may lead to two windows (e.g., two (i+1)th windows) $\overline{q_0q_1}$ and $\overline{q_1q_2}$ (which is partially shown in FIG. 8A) depending on a location of a vertex 802 of an obstacle. In this case, as shown in FIG. 8A, the motion planner 204 may calculate and maintain two different possible optimal path segments through the free-space segment, one from the left window $\overline{p_0p_1}$ to the first right window $\overline{q_0q_1}$, and another from the left window $\overline{p_0p_1}$ to the second right window $\overline{q_1q_2}$, such that the generated DAG may have a split at the node corresponding to these windows. However, when the DAG is generated, the free-space segment shown in FIGS. 8A to 8C may be converted to the curvilinear coordinate system as described above, for example, such that the lines shown in FIGS. 8A to 8C may be linearly converted to be straight in the free-space segments such as that shown in FIG. 6.

According to one or more example embodiments of the present disclosure, the motion planner 204 may calculate (e.g., may estimate or may approximate) the optimal (or near optimal) path segments for traversing across each of the free-space segments (e.g., see block 315 in FIG. 3) using a continuous dynamic programming method. In the continuous dynamic programming method, rather than sampling a plurality of discrete point-heading pairs across each of the windows, each window has an associated terminal cost, V(x, h), which is represented as an infinite dimensional value function, where x corresponds to any point (e.g., a starting position) along the ith window and h corresponds to any associated heading direction along the ith window to a next window (or to the destination point B). For example, the value function $V_i(x, h)$ represents the terminal cost of going through the ith window at any given point x and on any given heading direction h from the ith window towards the (i+1)th window. In this case, in some embodiments, the terminal cost $V_i(x, h)$ of the ith window may be modeled as a quadratic equation, for example, such as shown in Equation 2.

$$V_i(x,h) = (_i x)^T Q_{term}(_i x) + L_{term}(_i x) + c_{term}, \quad \text{Equation 2}$$

where $Q_{term}$ is a quadratic term, $L_{term}$ is a linear term, and $c_{term}$ is a constant term. However, the present disclosure is not limited thereto, and in other embodiments, the terminal cost $V_i(x, h)$ may be modeled as any suitable parametric function having a higher degree polynomial as needed or desired, or may be approximated using a neural network.

In some embodiments, the motion planner 204 may sample a suitable number of poses (e.g., point-heading pairs) along the ith window to fit the quadratic equation shown in Equation 2 (or any suitable parametric function). For example, as shown in FIG. 8B, in some embodiments, the motion planner 204 may sample a suitable number of initial poses (e.g., $(x_i, h_i)$ pair) to determine the coefficients of the quadratic equation shown in Equation 2, such that the terminal cost of the ith window (e.g., $\overline{p_0 p_1}$) may be determined (e.g., estimated or approximated).

In this case, in some embodiments, for each free-space segment in the vertical decomposition, the motion planner 204 may calculate terminal costs for each window going backwards using Equation 2 and using an initial pose (e.g., an initial sampled position-heading pair $(x_i, h_i)$) as initial constraints. For example, because the destination point B is known, the motion planner 204 may compute a "best curve" (e.g., a parametric cubic) originating from any point x with any heading direction h on a left window (e.g., $\overline{p_0 p_1}$) of a last stage according to the terminal cost value function V(x, h) of the left window and ending at the destination point B, or ending at a reference point z(1) on a corresponding right window $\overline{q_0 q_1}$, where the variables of the quadratic equation of the value function V(x, h) shown in Equation 2 are 8 coefficients of a planar cubic spline connecting the two windows.

For example, as shown in FIG. 8C, the 8 coefficients for a curve segment z(s) starting at an initial pose (e.g., an initial point-heading pair) z(0) on the left window $\overline{p_0 p_1}$ and ending at a reference pose (e.g., a reference point-heading pair) z(1) on the right window $\overline{q_0 q_1}$ (which may correspond to a pose on the right window $\overline{q_0 q_1}$ having a minimum cost to go to the destination point B or to another reference point of a next window) may be represented as $z=[x_0, x_1, x_2, x_3, y_0, y_1, y_2, y_3]$; $z_x(s) = x_0 s^0 + x_1 s^1 + x_2 s^2 + x_3 s^3$; $y_x(s) = y_0 s^0 + y_1 s^1 + y_2 s^2 + y_3 s^3$; $0 \le s \le 1$.

In some embodiments, the curve segment z(s) is evaluated to determine an optimal curve segment (e.g., an optimal path segment) having a minimum terminal cost for traversing across the free-space segment according to Equation 3 below.

$$\min_z \left\{ V(x, h) + \ell \left( \int_0^1 (r(s) - z(s))^2 ds + \rho \int_0^1 (z''(s))^2 ds \right) \right\} = \min_z z^T Q z + L z + c, \quad \text{Equation 3}$$

where $\int (r(s) - z(s))^2$ represents how close the curve segment z(s) is to the reference curve r(s) through the free-space segment, $\int (z''(s))^2$ represents a smoothness of the curve segment z(s) through the free-space segment, $\ell$ is a constant, and $\rho$ is a tuning parameter.

In this case, for example, for the curve segment z(s) having a fixed initial position $z(0) = \hat{x}$ along the left window $\overline{p_0 p_1}$, a fixed initial heading $z'(0) = \hat{h}$ along the left window $\overline{p_0 p_1}$, and ending at the reference pose z(1) lying on the right window $\overline{q_0 q_1}$, the linear constraints on the coefficients along the x-axis may be calculated as $z_x(0) = x_0 + x_1 s + x_2 s^2 + x_3 s^3 = x_0$; $z'_x(0) = x_1 + x_2 s + x_3 s^2 = x_1$; $z_x(1) = x_0 + x_1 s + x_2 s^2 + x_3 s^3 = x_0 + x_1 + x_2 + x_3$. Similarly, the linear constraints on the coefficients along the y-axis may be calculated as $z_y(0) = y_0 + y_1 s + y_2 s^2 + y_3 s^3 = y_0$; $z'_y(0) = y_1 + y_2 s + y_3 s^2 = y_1$; $z_y(1) = y_0 + y_1 s + y_2 s^2 + y_3 s^3 = y_0 + y_1 + y_2 + y_3$.

In this case, the motion planner 204 may identify a point-heading pair along the left window $\overline{p_0 p_1}$ that satisfies Equation 3, and may set the identified point-heading pair as the reference pose of the right window of a previous stage (e.g., between a previous window and the window $\overline{p_0 p_1}$). The motion planner 204 may repeat the method 900 for each of the previous stages, and once each of the optimal path segments are determined, the motion planner 204 may connect the path segments in a forward direction to generate the navigational path NP. In this case, a smoothing operation may not be needed or desired, but the present disclosure is not limited thereto.

Figure 9:
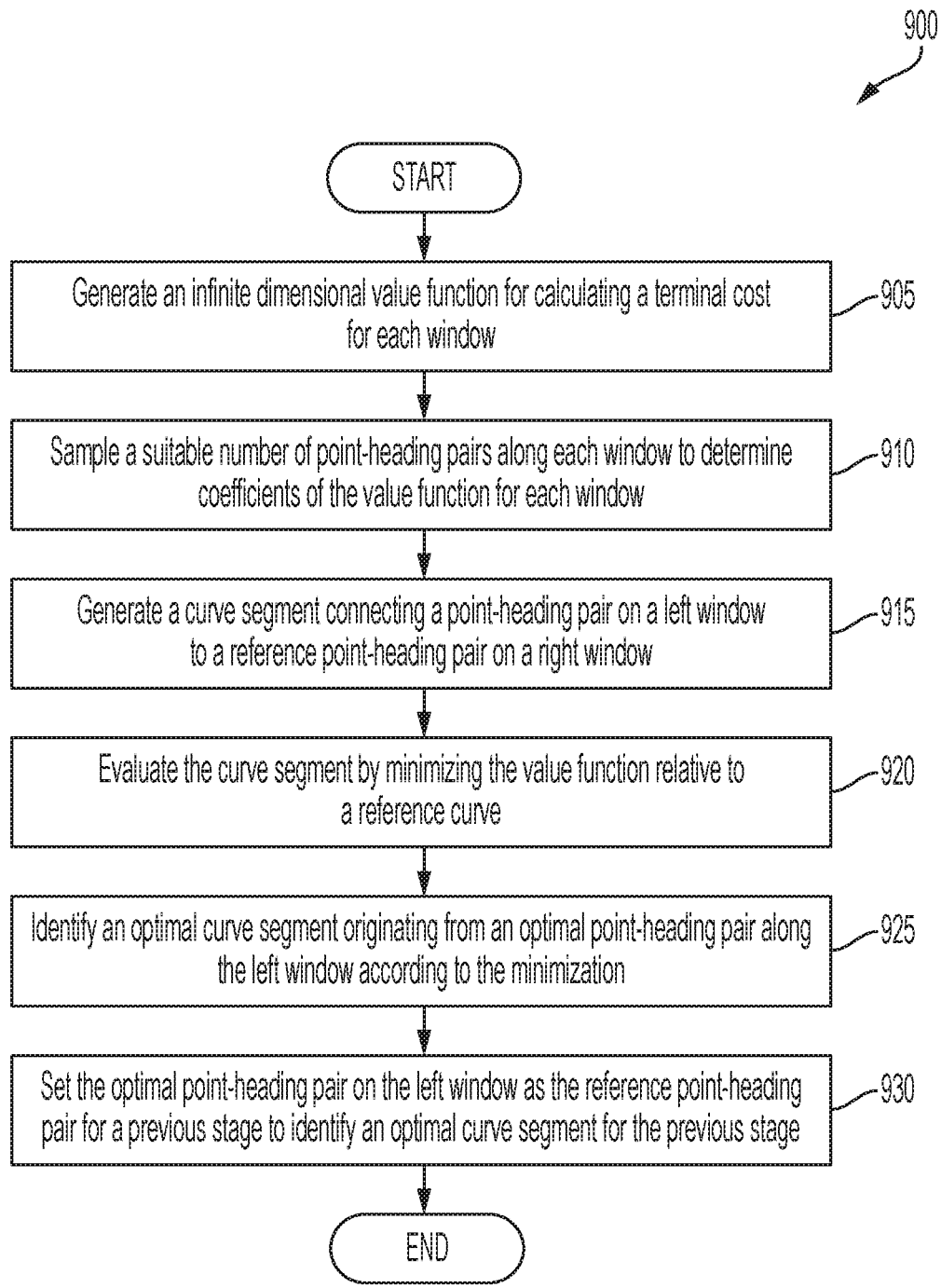
FIG. 9 is a flow diagram of a method of continuous optimization dynamic programming, according to one or more example embodiments of the present disclosure.

FIG. 9 is a flow diagram of a method of continuous optimization dynamic programming, according to one or more example embodiments of the present disclosure. However, the present disclosure is not limited to the sequence or number of the operations of the method 900 shown in FIG. 9, and can be altered into any desired sequence or number of operations as recognized by a person having ordinary skill in the art. For example, in some embodiments, the order may vary, or the method 900 may include fewer or additional operations. Further, the operations shown in the method 900 may be performed by any suitable one of the components or any suitable combination of the components of those of one or more example embodiments described herein.

Referring to FIG. 9, the method 900 may start, and in some embodiments, the motion planner 204 may generate an infinite dimensional value function for calculating a terminal cost for each window at block 905. For example, in some embodiments, the cost calculator 224 may generate the value function V(x, h) for each window as a quadradic equation as shown in Equation 2, or may generate the value function as a higher order parametric function or using a neural network. The motion planner 204 may then sample a suitable number of point-heading pairs along each window to determine coefficients of the value function for each window at block 910. For example, in some embodiments, the cost calculator 224 may generate a plurality of possible curve segments connecting each of the point-heading pairs along the left window $\overline{p_0p_1}$ to any point along the right window $\overline{q_0q_1}$ to identify suitable coefficients to fit the value function of the left window $\overline{p_0p_1}$.

In some embodiments, after determining the value function and coefficients thereof for the left window $\overline{p_0p_1}$, the motion planner 204 (e.g., the cost calculator 224) may generate a curve segment connecting a point-heading pair on the left window $\overline{p_0p_1}$ to a reference point heading pair on the right window $\overline{q_0q_1}$ at block 915. The reference point heading pair may correspond to an optimal point heading pair on the right window having an optimal path segment to the destination point B (or to a reference point-heading pair of a next window). For example, in some embodiments, the cost calculator 224 may connect the point-heading pairs of the windows using a planar cubic spline, but the present disclosure is not limited thereto.

In some embodiments, the motion planner 204 may evaluate the curve segment by minimizing the value function relative to a reference curve at block 920. For example, in some embodiments, the cost calculator 224 may evaluate the curve segment by minimizing Equation 3. Accordingly, in some embodiments, the motion planner 204 may identify an optimal curve segment originating from an optimal point-heading pair along the left window according to the minimization at block 925. For example, the cost calculator 224 may identify a point-heading pair on the left window that is connected to the reference point-heading pair on the right window that satisfies Equation 3.

In some embodiments, the motion planner 204 may set the optimal point-heading pair on the left window as the reference point-heading for a previous stage to identify optimal curve segments for the previous stage at block 930, and may repeat the method 900 for each previous stage to identify the optimal curve segments for each of the previous stages in a backward direction. In some embodiments, after determining all of the optimal curve segments (e.g., the optimal path segments) through the windows, the path connecter 226 may connect each of the optimal curve segments in the forward direction to generate the navigational path NP.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A motion planning system comprising:
   a processor; and
   memory configured to store instructions that when executed by the processor, cause the processor to:
   identify a reference path between a departure point and a destination point in an environment comprising one or more obstacles;
   generate decomposition segments of a space surrounding the reference path by casting a ray orthogonal to the reference path from a vertex of a perimeter of each of the one or more obstacles to a boundary, the decomposition segments comprising a first free-space segment and a second free-space segment that are devoid of the obstacles;
   generate a first path segment relative to the reference path for traversing the first free-space segment, and a second path segment relative to the reference path for traversing the second free-space segment; and
   connect the first and second path segments to each other to generate a navigational path to traverse the environment.

2. The system of claim 1, wherein the first and second free-space segments are orthogonal to the reference path.

3. The system of claim 1, wherein the instructions further cause the processor to:
   convert a Euclidean coordinate system corresponding to the space of the environment to a curvilinear coordinate system corresponding to the first and second free-space segments.

4. The system of claim 1, wherein the instructions further cause the processor to:
   order the first and second free-space segments to generate a directed acyclic graph (DAG),
   wherein the first and second free-space segments correspond to nodes of the DAG, and the ray corresponds to an edge of the DAG connecting the nodes.

5. The system of claim 1, wherein:
   the ray comprises a first ray corresponding to a first vertex of the one or more obstacles, a second ray corresponding to a second vertex of the one or more obstacles, and a third ray corresponding to a third vertex of the one or more obstacles;
   the first free-space segment is bounded between the first ray and the second ray; and
   the second free-space segment is bounded between the second ray and the third ray.

6. The system of claim 5, wherein to generate the first and second path segments, the instructions further cause the processor to:
   generate a first discrete sample point-heading pair along the first ray, a second discrete sample point-heading pair along the second ray, and a third discrete sample point heading pair along the third ray;
   connect the first discrete sample point-heading pair to the second discrete sample point-heading pair with a first curve; and
   connect the second discrete sample point-heading pair to the third discrete sample point heading pair with a second curve.

7. The system of claim 6, wherein to generate the first and second path segments, the instructions further cause the processor to:
   calculate a cost of the first curve relative to the reference path;
   calculate a cost of the second curve relative to the reference path;
   determine that the first curve and the second curve have minimum costs relative to the reference path; and
   set the first curve as the first path segment and the second curve as the second path segment.

8. The system of claim 5, wherein to generate the first and second path segments, the instructions further cause the processor to:
   generate a continuous cost value function for traversing between the first ray and the second ray;
   connect a point-heading pair along the first ray to a point-heading pair along the second ray with a first curve;
   generate a continuous cost value function for traversing between the second ray and the third ray; and
   connect a point-heading pair along the second ray to a point-heading pair along the third ray with a second curve.

9. The system of claim 8, wherein to generate the first and second path segments, the instructions further cause the processor to:
   evaluate a cost of the first curve by minimizing the continuous value function for traversing between the first ray and the second ray relative to the reference path;
   evaluate a cost of the second curve by minimizing the continuous value function for traversing between the second ray and the third ray relative to the reference path; and
   determine the first path segment and the second path segment based on the minimizations.

10. An autonomous motion planning method comprising:
identifying, by a processor, a reference path between a departure point and a destination point in an environment comprising one or more obstacles;
generating, by the processor, decomposition segments of a space surrounding the reference path by casting a ray orthogonal to the reference path from a vertex of a perimeter of each of the one or more obstacles to a boundary, the decomposition segments comprising a first free-space segment and a second free-space segment that are devoid of the obstacles;
generating, by the processor, a first path segment relative to the reference path for traversing the first free-space segment, and a second path segment relative to the reference path for traversing the second free-space segment; and
connecting, by the processor, the first and second path segments to each other to generate a navigational path to traverse the environment.

11. The method of claim 10, wherein the first and second free-space segments are orthogonal to the reference path.

12. The method of claim 10, wherein the method further comprises:
converting, by the processor, a Euclidean coordinate system corresponding to the space of the environment to a curvilinear coordinate system corresponding to the first and second free-space segments.

13. The method of claim 10, wherein the method further comprises:
ordering, by the processor, the first and second free-space segments to generate a directed acyclic graph (DAG), wherein the first and second free-space segments correspond to nodes of the DAG, and the ray corresponds to an edge of the DAG connecting the nodes.

14. The method of claim 10, wherein:
the ray comprises a first ray corresponding to a first vertex of the one or more obstacles, a second ray corresponding to a second vertex of the one or more obstacles, and a third ray corresponding to a third vertex of the one or more obstacles;
the first free-space segment is bounded between the first ray and the second ray; and
the second free-space segment is bounded between the second ray and the third ray.

15. The method of claim 14, wherein to generate the first and second path segments, the method further comprises:
generating, by the processor, a first discrete sample point-heading pair along the first ray, a second discrete sample point-heading pair along the second ray, and a third discrete sample point heading pair along the third ray;
connecting, by the processor, the first discrete sample point-heading pair to the second discrete sample point-heading pair with a first curve; and
connecting, by the processor, the second discrete sample point-heading pair to the third discrete sample point heading pair with a second curve.

16. The method of claim 15, wherein to generate the first and second path segments, the method further comprises:
calculating, by the processor, a cost of the first curve relative to the reference path;
calculating, by the processor, a cost of the second curve relative to the reference path;
determining, by the processor, that the first curve and the second curve have minimum costs relative to the reference path; and
setting, by the processor, the first curve as the first path segment and the second curve as the second path segment.

17. The method of claim 14, wherein to generate the first and second path segments, the method further comprises:
generating, by the processor, a continuous cost value function for traversing between the first ray and the second ray;
connecting, by the processor, a point-heading pair along the first ray to a point-heading pair along the second ray with a first curve;
generating, by the processor, a continuous cost value function for traversing between the second ray and the third ray; and
connecting, by the processor, a point-heading pair along the second ray to a point-heading pair along the third ray with a second curve.

18. The method of claim 17, wherein to generate the first and second path segments, the method further comprises:
evaluating, by the processor, a cost of the first curve by minimizing the continuous value function for traversing between the first ray and the second ray relative to the reference path;
evaluating, by the processor, a cost of the second curve by minimizing the continuous value function for traversing between the second ray and the third ray relative to the reference path; and
determining, by the processor, the first path segment and the second path segment based on the minimizations.

* * * * *